3,293,182
FUEL AND LUBRICANT COMPOSITIONS
La Verne N. Bauer, Cheltenham, and Peter L. de Benneville, Philadelphia, Pa., assignors to Rohm & Haas Company, Philadelphia, Pa., a corporation of Delaware
No Drawing. Filed Oct. 2, 1964, Ser. No. 401,236
12 Claims. (Cl. 252—51.5)

This application is a continuation-in-part of United States patent application Serial No. 349,485, filed March 4, 1964, in the hands of a common assignee.

This invention deals with novel compositions of matter. It further deals with fuels and lubricants having incorporated therein as an essential ingredient thereof specific N-vinyl-2-piperazinone polymers. The fuel compositions exhibit stability and rust protection. The lubricant compositions are characterized by dispersant detergent properties, pour-point depressing action and viscosity improvements. The lubricants are especially outstanding in sludge dispersant properties.

The present compositions are produced by incorporating into a fuel or lubricant base at least one of the polymers of the specific N-vinyl-2-piperazinones of the following formula

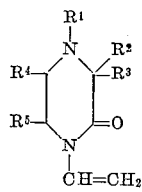

in which $R^1$ is hydrogen, alkyl, including cycloalkyl, of up to 18 carbon atoms, aralkyl or alkyl-substituted aralkyl of up to 18 carbon atoms, dialkylaminoalkyl of up to 12 carbon atoms wherein each of these alkyl groups contains up to 8 carbon atoms and furfuryl; $R^2$, individually, is hydrogen or methyl; $R^3$, individually is hydrogen, alkyl, including cycloalkyl, of up to 18 carbon atoms, phenyl, naphthyl and alkyl-, chloro- and alkoxy-substituted phenyl or naphthyl in which the alkyl portion contains up to 18 carbon atoms, aralkyl and alkyl-substituted aralkyl of up to 18 carbon atoms and 2-furyl; $R^4$, individually, is hydrogen or alkyl of up to 4 carbon atoms and $R^5$, individually, is hydrogen or alkyl of up to 4 carbon atoms.

$R^1$ may typically represent hydrogen, methyl, ethyl, isopropyl, t-butyl, cyclopentyl, cyclohexyl, octyl, dodecyl, octadecyl, benzyl, phenylethyl, phenylbutyl, phenyloctyl, dimethylbenzyl, dibutylbenzyl, octylbenzyl, nonylbenzyl, dimethylaminoethyl, 2-dimethylaminoisobutyl, diethylaminoethyl, dibutylaminoethyl, dipentylaminoethyl and furfuryl.

$R^2$ represents hydrogen or methyl.

$R^3$ typically represents hydrogen, methyl, ethyl, isopropyl, t-butyl, cyclopentyl, cyclohexyl, octyl, decyl, dodecyl, octadecyl, phenyl, naphthyl, chlorophenyl, dichlorophenyl, butylphenyl, dibutylphenyl, octylphenyl, nonylphenyl, methoxyphenyl, t-butoxyphenyl, octoxyphenyl, chloronaphthyl, butylnaphthyl, octylnaphthyl, methoxynaphthyl, ethoxynaphthly, benzyl, phenylethyl, phenylbutyl, phenyloctyl, dimethylbenzl, dibutylbenzyl, octylbenzyl, nonylbenzyl and 2-furyl.

In addition, $R^2$ and $R^3$, collectively, may typically represent, including the carbon atom to which they are attached, pentamethylene, hexamethylene or heptamethylene rings which may have alkyl substituents, such as methyl, ethyl, butyl, dimethyl or diethyl groups attached thereto. Here, the limitation to $R^2$ and $R^3$ is a total of 18 carbon atoms.

$R^4$ may typically represent hydrogen, methyl, ethyl, isopropyl and t-butyl.

$R^5$ may typically represent hydrogen, methyl, ethyl, isopropyl and t-butyl.

In addition, $R^4$ and $R^5$, collectively, including the carbon atoms to which they are attached, may typically represent pentamethylene, hexamethylene or heptamethylene rings which may have alkyl substituents, such as methyl, ethyl, butyl, dimethyl or diethyl groups attached thereto. Here, the limitation to $R^4$ and $R^5$ is a total of 18 carbon atoms.

The N-vinyl-2-piperazinones are prepared by reacting acetylene with a compound having the formula

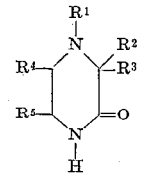

in which the symbols are as defined previously.

The reaction between acetylene and the 2-piperazinone may be conducted at atmospheric or superatmospheric pressures, such as up to about 2000 pounds per square inch, and according to batch or continuous techniques. It may be conducted in the presence or absence of a solvent although generally a solvent is preferred, particularly if the vinylation is conducted at superatmospheric pressures. Suitable solvents are those that are inert and organic, such as dimethylformamide, N-methylpyrrolidinone, dimethyl sulfoxide, isopropanol, tetrahydrofuran, dioxane and the like. Temperatures in the range of about 100° to about 250° C. are employed, preferably 130° to 220° C.

The acetylene and 2-piperazinone are reacted in the presence of a strongly basic vinylation catalyst, such as the alkali metals, their hydroxides and alkoxides. Typical in this respect are sodium, potassium, sodium methoxide, sodium butoxide,, sodium hydroxide, potassium ethoxide, potassium methoxide and potassium hydroxide. Preferred embodiments include sodium metal, potassium metal, sodium methoxide and potassium methoxide. The vinylation is preferably carried out by introducing acetylene, preferably in a solvent, to a selected 2-piperazinone in liquid or molten condition or more desirably also in a solvent, until the desired vinylation is consummated. At the conclusion of the reaction, the N-vinyl-2-piperazinones are isolated by distillation techniques, as will be more apparent hereinafter.

The N-vinyl-2-piperazinones, described hereinabove, can be homopolymerized or copolymerized with one or more ethylenically unsaturated polymerizable monomers. It is, of course, necessary for the present purposes that the polymers have sufficient oil solubility to be incorporated into the compositions of this invention, to be more fully delineated hereinafter.

Suitable as comonomers are alkyl and aryl acrylates in which the alkyl or aryl portion contains preferably 1 to 18 carbon atoms; alkyl and aryl methacrylates in which the alkyl or aryl portion contains preferably 1 to 18 carbon atoms; acrylonitrile; methacrylonitrile, alkylaminoalkyl and dialkylaminoalkyl acrylates and methacrylates; acrylamide and methacrylamide and their N-alkyl substituted derivatives; styrene and alkyl ring-substituted styrenes containing no more than a total of about 20 carbon atoms; α-methylstyrene; vinyl esters, in which the carboxylate portion contains 1 to 18 carbon atoms, including the carbon of the carboxylate functions; vinyl alkyl ethers and vinyl alkyl sulfides in which the alkyl portion contains no more than 18 carbon atoms and N- vinyl lactams, preferably containing from 6 to 20 carbon atoms; alkyl vinyl sulfones in which the alkyl portion contains up to about 18 carbon atoms; N-vinylalkyleneureas containing from 5 to 12 carbon atoms; olefins, such as isobutylene, butadiene and isoprene; dialkyl fumarates of up to 24 carbon atoms; dialkyl maleates of up to 24 carbon atoms; and dialkyl itaconates of up to 24 carbon atoms; and vinylpyridines.

In the above monomers, the alkyl groups may exhibit any possible spatial configuration, such as normal, iso, or tertiary. These alkyl groups may be acyclic or cyclic, including alkyl-substituted cyclic, as long as the total carbon content conforms to the defined amount. In the ring-substituted styrenes, the substituents may occupy any possible ring location or locations and when the substituents are alkyl groups, they may have any possible spatial configuration.

Typical of the above monomers that may be employed are methyl acrylate, isopropyl acrylate, cyclopentyl acrylate, 2-ethylhexyl acrylate, decyl acrylate, dodecyl acrylate, octadecyl acrylate, methyl methacrylate, t-butyl methacrylate, cyclohexyl methacrylate, octyl methacrylate, undecyl methacrylate, dodecyl methacrylate, phenyl methacrylate, dimethylaminoethyl methacrylate, methoxyethoxyethyl methacrylate, t-butylaminoethyl methacrylate, t-dodecylaminoethyl acrylate, octadecyl methacrylate, acrylonitrile, methacrylonitrile, N,N-dibutyl acrylamide, acrylamide, N-methylacrylamide, N-t-octylacrylamide, styrene, p-butylstyrene, p-octylstyrene, o-chlorostyrene, o,p-dipropylstyrene, p-cyanostyrene, o-methyl-p-decylstyrene, ureidoethyl vinyl ether, butyl vinyl sulfide, octyl vinyl sulfide, octadecyl vinyl sulfide, hydroxyethyl vinyl sulfide, N-vinyl-2-pyrrolidinone, N-vinyl-5-methyl-2-pyrrolidinone, N-vinyl-4,4-dimethyl-2-pyrrolidinone, N-vinyl-4-butyl-5-octyl-2-pyrrolidinone, N-vinyl-6-methyl-2-piperidone, N-vinyl-6-octyl-2-piperidone, N-vinyl-2-oxohexamethylenimine, N-vinyl-5,5-dimethyl-2-oxohexamethylenimine, N-vinyl-4-butyl - 5 - octyl - 2 - oxohexamethylenimine, methyl vinyl sulfone, isobutyl vinyl sulfone, t-octyl vinyl sulfone, dodecyl vinyl sulfone, octadecyl vinyl sulfone, N-vinylthyleneurea, N-vinyltrimethyleneurea, N-vinyl-1,2-propyleneurea, N-vinylbutyleneurea, N-vinylcarbazole, vinyl acetate, vinyl stearate, dimethyl maleate, dioctyl maleate, dimethyl itaconate, dibutyl itaconate, dihexyl itaconate, dimethyl fumarate, diethyl fumarate, dioctyl fumarate, dibutyl fumarate, didodecyl fumarate, dibutyl maleate, dihexyl maleate, didecyl maleate, diethyl itaconate, dioctyl itaconate, didodecyl itaconate and 2-methyl-5-vinylpyridine.

It is understood that in many cases it will be desirable, and frequently preferred, to combine one or more of the above-described specific N-vinyl-2-piperazinones with one or more of the above copolymers in order to achieve various modifications and properties in the product contemplated. It is, of course, necessary for the present purposes that the copolymers have sufficient oil solubility and, as will be apparent to one skilled in the art, the comonomer should be selected to impart this oil solubility.

Typical comonomers that impart oil solubility include acrylates and methacrylates, in which the alcohol residue contains 6 to 18 carbon atoms, and itaconates, fumarates and maleates, in which the alcohol residue contains 6 to 24 carbon atoms. Particularly useful in this respect are octyl, nonyl, dodecyl, isodecyl, isononyl, tridecyl, tetradecyl, octadecyl, phenyl, benzyl, cyclohexyl and alkylphenyl acrylates and methacrylates, itaconates, maleates and fumarates.

Another useful type of starting material comprises vinyl esters of monocarboxylic acids. Here, oil solubility can be controlled by the size of the hydrocarbon portion of the acid residue. If such ester or mixture of such esters is used to form the copolymer, it is usually desirable that the average group size be at least 8 carbon atoms.

There may also be employed with the monomers mentioned above, for the final copolymer, minor proportions of other monomers, such as acrylic, methacrylic or itaconic acid, maleic anhydride, half esters of maleic, fumaric or itaconic acid, acrylamide, N-substituted acrylamides, methacrylamide, N-substituted methacrylamides, acrylonitrile, methacrylonitrile, vinyl esters of lower monocarboxylic acids, vinyl ethers, vinyl thioethers, vinyl ketones, vinyl chloride and vinylidene chloride.

It is preferred to employ the specific N-vinyl-2-piperazinones, described above, with an alkyl ($C_1$–$C_{18}$) methacrylate, alkyl ($C_1$–$C_{18}$) acrylate, acrylamide, acrylonitrile, dialkyl ($C_1$–$C_{18}$) fumarate, dialkyl ($C_1$–$C_{18}$) maleate, styrene or vinyl esters. While in most instances the copolymers of the present invention are prepared from a specific heterocyclic compound, with one of the other listed monomers, it is quite satisfactory for many uses to employ additional monomers as desired in order to arrive at desired properties in the final product.

Homopolymers may be employed in the present compositions so long as they have sufficient oil solubility, as will be understood by those skilled in the art. Copolymers employed in the present compositions may be prepared in a wide range of percentages and molecular units. The valuable properties, described hereinbefore, are observed when as little as 0.5% by weight of the specific N-vinyl-2-piperazinones are employed in the copolymer. It is generally preferable to use about 2% or more of the specific N-vinyl-2-piperazinone monomer. As an upper limit, it is preferred to use about 80% by weight of the N-vinyl-2-piperazinone monomer in the copolymer.

Polymerization may be carried out in bulk when the monomers are liquids or low-melting solids, in solution, or in either suspension or emulsion. In bulk and solution polymerization, the reaction may be carried out without catalysts, initiated with light and heat, but it is preferred to use one or more of the peroxide or azo initiators which act as free radical catalysts, and are effective between 30° and 150° C. They may be employed in amounts of 0.01% to 10% or more by weight, preferably 0.01% to 1% by weight. Typical initiators include benzoyl peroxide, t-butyl peroxide, acetyl peroxide, capryl peroxide, t-butyl hydroperoxide, cumene hydroperoxide, t-butyl perbenzoate, diisopropylbenzene hydroperoxide, triisopropylbenzene hydroperoxide, methyl cyclohexane hydroperoxide, di-t-butyl peroxide, methylethyl ketone peroxide, azodiisobutyronitrile, azodiisobutyramide, dimethyl, diethyl or dibutyl azodiisobutyrate, azobis-($\alpha,\gamma$ - dimethylvaleronitrile), azobis($\alpha$ - methylbutyronitrile), azobis($\alpha$-methylvaleronitrile), dimethyl or diethyl azobis-$\alpha$-methylvalerate and the like.

In conjunction with a hydroperoxide, it is desirable, but not absolutely essential, to supply an activator. Its effect seems at least in part to provide free radicals at somewhat lower temperatures than are effective for free radical formation from hydroperoxides in the absence of such activator.

Especially effective as activators are quaternary ammonium compounds. Typical compounds of this sort are benzyltrimethylammonium chloride, dibenzyldimethylammonium bromide, butyldimethylbenzylammonium chloride, octyltrimethylammonium chloride, dodecyldimethylbenzylammonium chloride, nonylbenzyltrimethylammonium chloride, dodecylbenzyldimethylbenzylammonium chloride, didodecyldimethylammonium chloride, benzyldimethyldodecenylammonium chloride, octylphenoxyethyldimethylbenzylammonium chloride, diisobutylphenoxyethoxyethyldimethylbenzylammonium chloride, octylpyridinium chloride, N-octyl-N-methylmorpholinium chloride or bis-quaternary salts, such as those having quaternary nitrogens linked with an alkylene group, an ether group or an amide-containing group.

The amount of activator is proportioned to the amount of hydroperoxide. Usually, the proportion of quaternary ammonium compound will be from 5% to 40% of the weight of the hydroperoxide.

Solution polymerization may be carried out in kerosene, mineral oils, diesters, such as di(2-ethylhexyl)adipate or sebacate, chlorinated hydrocarbons, such as chloroform or ethylene chloride, tributylphosphate, dibutyl phenyl phosphate, silicate esters or silicone fluids, benzene, toluene, xylene, solvent naphthas, dioxane, diisobutyl ketone, acetonitrile, dimethyl formamide, t-butyl alcohol and the like, depending on the solubilities of the monomers it is desired to use.

Emulsion polymerization is particularly effective with those members of the heterocyclic series which have low solubilities in water. There may be used in forming the emulsion non-ionic or cationic emulsifiers, such as dodecyldimethylbenzylammonium chloride, dodecylbenzyltrimethylammonium chloride, cetylpyridinium chloride, alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols and the like; polyethoxyethanol derivatives of methylene-linked alkyl phenols; sulfur-containing agents, such as those made by condensing 6 to 60 or more moles of ethylene oxide with nonyl, dodecyl, tetradecyl, t-dodecyl and the like, mercaptans or with alkylthiophenols having alkyl groups of 6 to 15 carbon atoms; ethylene oxide derivatives of long-chained carboxylic acids, such as lauric, myristic, palmitic, oleic and the like or mixtures of acids, such as found in tall oil containing 6 to 60 oxyethylene units per molecule; analogous ethylene oxide condensates of long-chained alcohols, such as octyl, decyl, lauryl or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched-chain amines, such as dodecylamine, hexadecylamine and octadecylamine, containing 6 to 60 oxyethylene groups, block copolymers of ethylene oxide and propylene oxide comprising a hydrophobic propylene oxide section combined with one or more hydrophilic ethylene oxide sections.

In the case of emulsion polymerization especially, a redox catalyst system is extremely effective. This includes the use of an organic peroxide, such as benzoyl peroxide, acetyl peroxide, capryl peroxide and the like, or an inorganic peroxide, such as hydrogen peroxide, ammonium persulfate, sodium persulfate, potassium persulfate or the like. The peroxidic catalyst is effectively coupled with a reducing agent, such as a sulfite, bisulfite, metasulfite or hydrosulfite of ammonium, sodium, potassium or the like.

Polymerization may also be initiated by high-energy irradiation. Suitable sources of high-energy irradiation are radioactive materials and electron accelerators. Useful as radioactive materials that supply gamma rays are irradiated isotopes, such as $Co^{60}$, fission products, such as $Cs^{137}$, adjuncts to fission reactants, such as radioactive xenon and the like. A $Co^{60}$ source is particularly effective. Useful as radioactive materials that supply beta rays are $Sr^{90}$ and the like. Valuable as electron accelerators, which supply beta rays, are the Van de Graaf generator, the resonant transformer and the like. Dosages in the range of 10,000 to 10,000,000 rep.'s, preferably 500,000 to 2,000,000 rep.'s, are employed. A rep. is equivalent to the ionization produced by the absorption of 93 ergs of energy per gram of irradiated substance. Rep. stands for Roentgen-equivalent-physical and is a unit of intensity and time.

The copolymerization of the monomers, described hereinbefore, may be conducted by mixing all of the monomers to be used at substantially the same time or one of the comonomers may be partially polymerized and then another comonomer or comonomers may be added at a later time either all at once or incrementally. The copolymers of the N-vinyl-2-piperazinone monomer may also be prepared as a graft copolymer by carrying out the polymerization of the oil-solubilizing portion of the copolymer to about 40% to 90%, then adding the N-vinyl-2-piperazinone monomer either alone or in combination with another ethylenically unsaturated polymerizable monomer, preferably, but not necessarily, in the presence of a free-radical catalyst. The initiator and activator may be employed by incremental addition from time to time or all at once, as desired. Generally, the incremental addition is preferred.

The final copolymer may be taken up in a liquid, such as a petroleum oil or synthetic lubricant, and a concentrate prepared in the range of about 10% to 60% of the copolymer. Volatile solvent and monomer may be volatilized from the mixture of copolymer and oil or synthetic lubricant. The concentrate is convenient for handling, stripping and blending.

Copolymers may be prepared over a wide range of molecular weight by variations in temperature, time, catalyst and particular monomers contemplated. Molecular weights as determined by viscosity methods generally range from about 20,000 to 2,000,000 or more. Low molecular weights are especially desirable when the polymers are to be resistant to shear. The high molecular weight polymers are desired when maximum thickening and other optimum properties are required. Regulation of molecular weights can be accomplished by standard methods, such as by the use of mercaptans, such as octyl mercaptan.

For purposes of determining the extent of copolymerization, there may conveniently be used a simple method which comprises isolating the copolymer from the reaction mixture, as by removal of a volatile solvent. Estimation of the extent of formation of the copolymer is particularly desirable in establishing the proper time of copolymerization for a given system in which proportions of initiator, concentrations and temperatures are fixed.

In one useful form of test for extent of copolymerization, a 1 gram sample of copolymerizing mixture is taken and dissolved in 5 ml. of benzene. The resulting solution is mixed with 15 ml. of methanol. Copolymer precipitates and is separated by centrifuging.

The compositions of the present invention are produced by incorporating from about 0.001% to 10% by weight of at least one of the above-described N-vinyl-2-piperazinone polymers in the oil or fuel base contemplated. For lubricant formulations, the polymers of the present invention are used in the amounts of 0.1% to 10.0%, preferably 0.2% to 2.0% by weight. In fuels, the range is 0.001% to 0.1%, preferably 0.005% to 0.05% by weight.

The compositions of the present invention possess the advantageous combination of a high degree of effectiveness with respect to dispersant-detergent properties, pour-point depressing action and viscosity improvements.

The following describes some of the tests employed in evaluating the valuable compositions of the present invention:

DISPERSANCY TEST

A method for determining the dispersing activity of any given polymer is based on the capacity of the polymer to disperse asphaltenes in a typical mineral oil.

The asphaltenes are obtained by oxidizing a naphthenic oil with air under the influence of a trace of iron salt as catalyst, such as ferric naphthenate. The oxidation is desirably accomplished at 175° C. for 72 hours by passing a stream of air through a naphthenic oil. Pentane is added to the cooled, oxidized oil to form a sludge which may be separated by centrifuging. The sludge is freed from oil by extracting it with pentane. It is then taken up with chloroform and the resulting solution is adjusted to a solids content of about 2% (wt. per vol.).

When a polymer is to be examined for its dispersing activity, it is dissolved in a standard oil, such as a solvent-extracted 100 neutral. Blends may be prepared to contain percentages varying from about 2% to 0.01% or even lower of polymer in oil.

A 10 ml. sample of a blend is treated with 2 ml. of the standard solution of asphaltenes in chloroform. The sample and reagent are thoroughly mixed in a test tube and the tube is placed in a forced draft oven at 150° C. for 2 hours to drive off volatile material. The tube is then allowed to cool and the appearance of the sample is noted.

If the polymer has dispersing activity, the oil will appear clear although colored.

Experience has demonstrated that, unless a polymer exhibits dispersing activity at concentrations below about 2% in the above test, it will fail to improve the cleanliness of engine parts in actual engine tests.

API SERVICE MS SEQUENCE V-A TEST

This test evaluates the sludge dispersant characteristics of a lubricant under low and medium temperature operating conditions. A single cylinder oil test engine is operated under conditions described in ASTM Special Technical Publication No. 315, published by the American Society for Testing and Materials, 1916 Race Street, Philadelphia 3, Pa.

The engine may be rated at any time during the course of the test. The 7 parts rated for sludge (CRC Merit, 10=clean) are the rocker arm assembly, rocker arm cover plate, valve deck, timing gear cover, push rod cover plate, push rod chamber and oil pan.

PANEL COKER TEST

This test is described in the record of the Fifth World Petroleum Congress (1959) in an article by R. M. Jolie, "Laboratory Screening Test for Lubricating Oil, Detergents and Dispersants." A sample of a compound under test is dissolved in a 170 SUS Mid-Continent Solvent Extracted Neutral containing 1% of a thermally unstable zinc dialkyldithiophosphate. The blend is placed in a heated sump and is splashed against a heated panel held at 570° F. for 2 hours. Gain in weight of the panel is determined and compared with oil without the test compound.

SUNDSTRAND PUMP TEST

In this test for distillate fuel oils, 1 liter of fuel oil containing 4 grams of synthetic sludge is treated with the additive. The oil is circulated for an hour through a Sundstrand oil burner pump containing a 100-mesh strainer. The sludge deposit is collected and weighed. (Nelson, Osterhaut and Schwindeman, Ind. Eng. Chem. 48, 1892 (1956).)

As will be clearly understood in the art, the fuels contemplated are distillate fuels that boil from 75° to 750° F. which includes gasolines, along with jet and diesel fuels and furnace oils. The present compounds are particularly useful in fuels that boil up to about 600° F., that is, the normal gasolines and jet fuels.

Lubricating compositions of this invention may be based on mineral oils or on synthetic lubricants. The mineral oils may vary over a wide range of viscosity, such as 1 to 25 centistokes at 210° F. These oils may be of naphthenic or paraffinic nature or may be of various mixtures. They may be distillates or mixtures of neutral oils and bright stocks. The lubricants may be bodied or gelled and used as greases, if desired. The oils may vary from spindle oils or hydraulic oils to oils for reciprocating aircraft engines. They include oils for sparking combustion and compression ignition engines, varying from grades identified as S.A.E. 5 to S.A.E. 50. Other types of lubricants are also included, such as hydraulic and automatic transmission fluids.

The synthetic lubricants include esters, such as dioctyl, dinonyl or isodecyl adipates, azelates or sebacates, polyethers and silicones. When use as hydraulic fluids is contemplated, phosphate esters are included as a base.

In the present compositions, there may also be used as a base, a transmission fluid, hydraulic fluid, gear oil or grease.

In the compositions of this invention, there may be used one or more other additives, such as anti-oxidants, anti-foam agents, anti-rust agents, anti-wear agents, heavy duty detergents, pour-point depressants, viscosity index improvers, or other type of additive. For example, there may be employed one or more of the dithiophosphates, such as zinc, barium, or nickel dialkyldithiophosphate, sulfurized oils, such as sulfurized sperm oil and sulfurized terpenes, alkylphenol sulfides, alkylaryl sulfonates, petroleum sulfonates whether normal or with alkaline reserve, such as calcium, barium or strontium petroleum sulfonates, polymers and copolymers from alkyl acrylates, methacrylates, itaconates, or fumarates or vinyl carboxylates and mixtures thereof, copolymers of acrylic esters and polar monovinylidene compounds, such as N-vinyl-2-pyrrolidinone, vinylpyridines, aminoalkyl acrylates or methacrylates, or polyethyleneglycol acrylic esters, polybutenes, alkylphenol-alkylene oxide condensates, alkenylsuccinic anhydrides, various silicones and alkyl or aryl phosphates, such as tricresyl phosphates. There may also be used 4,4'-methylenebis-2,6-di-tert-butylphenol, trialkylphenols, tris-(dimethylaminomethyl)phenol, phenothiazine, naphthylamines, N'-sec-butyl - N,N - dimethyl-p-phenylenediamine, alkaline earth alkylphenates, alkaline earth salicylates, calcium phenylstearate, alkylamines, especially $C_{12}$–$C_{24}$ alkylamines, cyclic amines, alkyl and aryl imidazolines and alkenyl succinic anhydrides reacted with amines and then with boron compounds, such as boron oxide, boron halides and boron esters.

While a pour-point depressant and a viscosity index improver may be added in addition to a copolymer of this invention, there may be used in place of such separate additives a copolymer of this invention which supplies not only dispersant action, but also one or both of these other actions. Thus, a copolymer of an ester described hereinbefore, which contains some alkyl groups of 16 or more carbon atoms, particularly cetyl or stearyl together with smaller groups, such as myristyl lauryl or octyl will lower the pour point of oils having a waxy pour-point and at the same time improve temperature-viscosity relationships. Improvements in viscosity index can be emphasized by the choice of substituents and such improvements can be had without lowering of pour-point if this is desired.

A turbo prop lubricant may be prepared by blending the copolymers of this invention with di-2-ethylhexyl sebacate and a mixture of polyesters formed by condensing 2-ethyl-1,3-hexanediol and sebacic acid into the polyesters with 2-ethylhexanol, there being an average of about 3 glycol units per molecule. This composition may also contain antioxidant, stabilizer or other useful additives.

The polymers are incorporated into fuels or lubricants according to standard procedures and according to the amounts set forth hereinbefore.

The compositions of the present invention may be more fully understood from the following illustrative examples. Parts by weight are used throughout.

Example 1

A mixture is made of 15 parts of hexadecyl methacrylate, 5 parts of 3,3-dimethyl-4-dodecyl-1-vinyl-2-piperazinone and 0.02 part of azodiisobutyronitrile. The mixture is heated under nitrogen for 24 hours at 70° C. The viscous oil which results is useful as an additive for stabilizing heating and lubricating oils.

In the Sunstrand Pump Test at 0.01 gram of the above copolymer in 100 ml. of oil, the weight of sludge retained on the screen is 27 mg., while the oil without additive gives 210 mg.

Similar polymers are prepared in the same manner, substituting, respectively, 3,3-dimethyl-1-vinyl-2-piperazinone, 3 - dodecyl-5,6-tetramethylene-1-vinyl-2-piperazinone and 4-octadecyl-1-vinyl-2-piperazinone for the 3,3-dimethyl-4-dodecyl-1-vinyl-2-piperazinone.

*Example 2*

A mixture is made of 50 parts of toluene, 50 parts of vinyl laurate, 10 parts of vinyl acetate, 3 parts of 3,3-dimethyl-1-vinyl-2-piperazinone. It is heated to 70° C. while nitrogen is passed over the surface. To the mixture is then added 0.2 part of azodiisobutyronitrile. After 8 hours of heating, there is obtained a viscous solution of polymer, which is useful as a stabilizing lubricating oil additive.

In the Sundstrand Pump Test at 0.01 gram of the above copolymer in 100 ml. of oil, the weight of the sludge is 42 mg., while the oil without additive gives 210 mg.

Similarly, useful polymers are prepared using 3-ethyl-3-methyl-1-vinyl-2-piperazinone and 4 - benzyl - 1 - vinyl-2-piperazinone in place of 3,3-dimethyl-1-vinyl-2-piperazinone.

*Example 3*

A 500 cc. round bottom, 3-neck flask is equipped with a gas inlet tube, a condenser and a semi-circular glass stirrer. The system is flushed with nitrogen and the oil bath surrounding the reaction flask is maintained at 99° C. There is added to the flask a mixture consisting of 46.0 parts of lauryl-myristyl methacrylate, 4.0 parts of 1-vinyl-3,3-dimethyl-2-piperazinone, 3.0 parts of toluene and 0.1 part of azobisisobutyronitrile. The lauryl-myristyl methacrylate is the methacrylate ester prepared from a commercial alcohol which analyzes 4% decanol, 66.4% dodecanol, 27.2% tetradecanol, and 2.4% hexadecanol. The reaction mixture is heated to 88° C., which time was recorded as 0.00 hours, and an exotherm raises the temperature to 93° C. The reaction mixture is cooled to 80° to 85° C. and this temperature range is maintained throughout the polymerization. Additions of 0.01 part of azobisisobutyronitrile in 5.0 parts of toluene are made at 2.67, 3.33, 4.67 and 5.33 hours. Toluene, 25.0 parts, is added to the reaction mixture at 6.00 hours, and the bath is removed at 6.50 hours when the reaction is considered complete. The resulting toluene solution is 42.8% of copolymer representing a polymer yield of 83.7%.

The toluene solution of copolymer is diluted with 100 neutral viscosity oil and the toluene is stripped from the solution at 125° C. for one hour at 10 mm. of Hg. The resulting solution is 25% of copolymer in oil and has a viscosity of 165.3 cs. at 210° F. Analysis of the copolymer for nitrogen reveals that approximately 96% of the nitrogen containing monomer is incorporated into the polymer.

It is determined that 0.06% of copolymer disperses 0.2% asphaltenes in an oil test blend at 150° C.

In the Sundstrand Pump Test at 0.04 gram of the above copolymer in 100 ml. of oil, the weight of the sludge is 16 mg., while the oil without additive gives 210 mg.

In the Panel Coker Test, a blend containing 1% of the above polymer gives a deposit of 23 mg. The same oil without any additive gives a deposit of 322 mg.

Four parts of the above copolymer is blended with 1 part of a commercial zinc dialkyldithiophosphate into 95 parts of a 170 SUS Mid-Continent Solvent Extracted Neutral oil. The viscosity of this blend is 7.31 cs. at 210° F. and 45.74 cs. at 100° F. with a viscosity index of 127. This lubricant is evaluated in the Sequence V-A Engine test. The total sludge retained at the end of 100 hours is 65.3 (70.0=clean). A test on the oil without any additive gives 48.1 at the end of 100 hours. The ASTM pour point of this lubricant is —40° F. The oil without the copolymer has a pour point of 0° F.

Four parts of the copolymer of this example is blended with 0.7 part of 4,4¹-methylenebis(2,6-di-t-butylphenol), 1.0 part of tricresylphosphate, 0.30 part of sulfurized sperm oil into 94 parts of a 170 SUS Mid-Continent Solvent Extracted Neutral oil. The viscosity of this blend is 7.21 cs. at 210° F. and 44.85 cs. at 100° F. with a viscosity index of 127.

A portion of the toluene solution of the copolymer of this example is diluted with di-2-ethyl sebacate, and the toluene is stripped from the solution at 125° C. for 1 hour at 10 mm. The resulting solution is 30% of copolymer in the diester and has a viscosity of 598.3 cs. at 210° F. Two parts of the copolymer in diester is blended with 1 part of phenothiazine and 1 part of tricresylphosphate into 96 parts of di-2-ethyl sebacate. The fluid is tested in the corrosion and oxidation stability test at 347° F. as described in Federal Test Method No. 5308 and required for Aircraft Turbine Engine Lubricating Oil Specification MIL-L-7808. The oxidation tubes have a clean appearance as compared to a comparable test without the copolymer.

Four parts of the copolymer of this example is blended with 5 parts of the commercial automatic transmission fluid additive, Lubrizol 280, in 91 parts of a 4.0 cs. at 210° F., 95 V.I. base oil. The resulting solution has a viscosity of 7.5 cs. at 210° F. This fluid is tested under conditions of Federal Test Method No. 5308 at 300° F. At the end of 300 hours, the paper spot test shows the sludge in the fluid is still dispersed. A similar test on a fluid containing a non-dispersant viscosity modifier instead of the copolymer of this example fails at the end of 72 hours.

A portion of the toluene solution of the copolymer of this example is diluted with di-2-ethyl sebacate, and the toluene is stripped from the solution at 125° C. for 1 hour at 10 mm. The resulting solution is 30% of copolymer in the diester and has a viscosity of 598.3 cs. at 210° F. Two parts of the copolymer in diester is blended with 1 part of phenothiazine and 1 part of tricresylphosphate into 96 parts of di-2-ethyl sebacate. The fluid is tested in the corrosion and oxidation stability test at 347° F., as described in Federal Test Method No. 5308 and required for Aircraft Turbine Engine Lubricating Oil Specification MIL-L-7808. The oxidation tubes have a clean appearance as compared to a comparable test without the copolymer of this example.

Four parts of the copolymer of this example is blended with 5 parts of the commercial automatic transmission fluid additive, Lubrizol 280, in 91 parts of a 4.0 cs. at 210° F., 95 V.I. base oil. The resulting solution has a viscosity of 7.5 cs. at 210° F. This fluid is tested under conditions of Federal Test Method No. 5308 at 300° F. At the end of 300 hours, the paper spot test shows the sludge in the fluid to be dispersed. A similar test on a fluid containing a non-dispersant viscosity modifier instead of the copolymer of this example fails at the end of 72 hours.

*Example 4*

A 500 cc. round bottom, 3-neck flask is equipped with a gas inlet tube, a condenser and a semi-circular glass stirrer. The system is flushed with nitrogen and the oil bath surrounding the reaction flask is maintained at 105° C. There is added to the flask a mixture consisting of 46.0 parts of lauryl-myristyl methacrylate, 3.0 parts of toluene and 0.1 part of azobisisobutyronitrile. The reaction mixture is heated to 80° C., which time is recorded as 0.00 hours, and an exotherm soon raises the temperature to 95° C. The mixture is cooled to 80° to 85° C. and this temperature range is maintained throughout the polymerization. At 2.00 hours, there is added to the reaction vessel a mixture consisting of 4.0 parts of 1-vinyl-3,3-dimethyl-2-piperazinone, 0.05 part of azobisisobutyronitrile and 1.5 parts of toluene. Additions of 0.01 part of azobisisobutyronitrile in 5.0 parts of toluene are made at 2.67, 3.33, 4.00, 4.67 and 5.33 hours. Toluene, 25.0 parts, is added to the reaction mixture at 6.00 hours, and the bath is removed at 6.50 hours when the reaction is considered complete. The resulting toluene solution is 45.1% of copolymer representing a polymer yield of 88.4%.

The toluene solution of copolymer is diluted with 100 neutral viscosity oil, and the toluene is stripped from the solution at 125° C. for 1 hour at 10 mm. The resulting solution is 25% of copolymer in oil and has a viscosity of 202.9 cs. at 210° F.

It is determined that 0.06% of copolymer disperses 0.2% asphaltenes in an oil test blend at 150° C.

In the Sundstrand Pump Test at 0.04 gram of the above copolymer in 100 ml. of oil, the weight of sludge is 15 mg. while the oil without additive gives 210 mg.

In the Panel Coker Test, a blend containing 1% of the above copolymer gives a deposit of 53 mg. The same oil without any additive gives a deposit of 322 mg.

Four parts of the above-copolymer is blended with one part of the commercial zinc dialkyldithiophosphate into 95 parts of a 170 SUS Mid-Continent Solvent Extracted Neutral oil. The viscosity of this blend is 7.37 cs. at 210° F. and 46.36 cs. at 100° F. with a viscosity index of 126. The ASTM pour point of this lubricant was −40° F.

*Example 5*

A reaction vessel is fitted with an Allihn condenser and a nitrogen inlet tube. There is added to the reaction vessel a mixture consisting of 4.76 parts of lauryl acrylate, 0.25 part of 1-vinyl-2-piperazinone, 0.005 part of azobisisobutyronitrile and 1.25 parts of toluene. The nitrogen inlet tube is inserted into the monomer mixture, the system is flushed with nitrogen and an oil bath maintained at 100° to 105° C. is raised around the reaction mixture. Time is recorded as 0.00 hours. Additions of 0.002 part of azobisisobutyronitrile in 0.25 part of toluene are made at 2.00, 3.00, 4.00, 5.00 and 6.00 hours. The polymerization is stopped by cooling the reaction mixture to room temperature and resumed the following day with the bath temperature maintained once more at 100° to 105° C. At 6.17 hours, 0.005 part of azobisisobutyronitrile is added to the mixture, and additions of 0.002 part of the initiator are also made at 8.17, 9.17, 10.17, 11.17 and 12.17 hours. The polymerization is considered complete at 13.00 hours. The resulting toluene solution is 68.6% of copolymer representing a polymer yield of 80.6%. A portion of the toluene solution of copolymer is diluted with 100 neutral viscosity oil, and the toluene is stripped from the solution at 125° C. for one hour at 10 mm. The resulting solution is 25% of copolymer in oil and has a viscosity of 456.9 cs. at 210° F.

In the Sundstrand Pump Test at 0.04 gram of the above copolymer in 100 ml. of oil, the weight of the sludge is 47 mg. while the oil without additive gives 210 mg.

In the Panel Coker Test, a blend containing 1% of the above copolymer gives a deposit of 26 mg. The same oil without any additive gives a deposit of 322 mg.

Four parts of the above copolymer is blended with one part of a commercial zinc dialkyldithiophosphate into 95 parts of a 170 SUS Mid-Continent Solvent Extracted Neutral oil. The viscosity of this blend is 8.43 cs. at 210° F. and 52.76 cs. at 100° F. with a viscosity index of 132. The ASTM pour point of this lubricant is −20° F.

*Example 6*

Following the procedure described in Example 3, 25 parts of cetyl-stearyl methacrylate, 23 parts of n-butyl methacrylate, and 2 parts of 1-vinyl-2-piperazinone are mixed with 3 parts of toluene and 0.1 part of azobisisobutyronitrile. The cetyl-stearyl methacrylate is the methacrylate ester prepared from a commercial alcohol which analyzes 2% tetradecanol, 30% hexadecanol and 68% octadecanol. This monomeric mixture is fed to the polymerization vessel heated at 88° to 90° C. during 100 minutes. A total of 0.05 part of azobisisobutyronitrile and 25 parts of toluene are used during the course of the copolymerization. Twenty-five parts of toluene are added to the reaction mixture at 6.00 hours and heating is stopped at 6.5 hours. The batch analyzes 44% of copolymer.

This copolymer is transferred to 100 SUS neutral oil on mixing an equal weight of oil with the toluene solution and then stirring and heating to 125° C. under a reduced pressure until the reduced pressure gauge registers 10 mm. of mercury. The system is vented and sufficient oil is added to reduce the copolymer concentration to 25%.

In the Sundstrand Pump Test at 0.04 gram of the above copolymer in 100 ml. of oil, the weight of sludge is 20 mg. while the oil without additive gives 210 mg.

In the Panel Coker Test, a blend containing 1% of the above copolymer of this invention gives a deposit of 46 mg. The same oil without additive gives a deposit of 322 mg.

Six parts of the above copolymer is blended with 1 part of a commercial zinc dialkyldithiophosphate into 93 parts of a 170 SUS Mid-Continent Solvent Extracted Neutral oil. The viscosity of this blend is 11.24 cs. at 210° F. and 61.61 cs. at 100° F. with a viscosity index of 140. The ASTM pour point of this lubricant is −25° F.

*Example 7*

To a clean weighed vessel is charged:
9.78 parts of cetyl-stearyl methacrylate, 93% pure by gas-liquid chromatography (GLC) analysis, representing 9.10 parts of 100% methacrylate esters,
20.8 parts of isodecyl methacrylate, 96% pure by GLC, representing 19.97 parts of 100% polymerizable methacrylate,
2.83 parts of n-butyl methacrylate, 99% pure by GLC, representing 2.80 parts 100% n-butyl methacrylate,
3.15 parts 1-vinyl-3,3-dimethyl-2-piperazinone,
3.5 parts light mineral oil,
0.175 part diisopropylbenzene hydroperoxide solution (50% active ingredient as furnished commercially) and
0.026 part lauryl mercaptan.

To a clean polymerization vessel fitted with thermometer, dropping funnel, inlet and water tubes for nitrogen gas, and electrically heated oil bath, is charged 0.035 part of an n-butanol solution (25% of tert-octylphenoxyethoxyethylbenzyldimethylammonium chloride monohydrate), 12.36 parts of the above monomeric mixture, and 1.75 parts of light mineral oil. With the apparatus flushed with nitrogen, the charge is heated to 100° C. Within 10 minutes, copolymerization ensues and an exotherm occurs raising the batch temperature to 120° C. After 20 minutes, the remaining monomeric mixture is charged to the polymerization vessel during 110 minutes, maintaining a batch temperature of 115° to 120° C. Incremental additions of 50% solution of diisopropylbenzene hydroperoxide, of 25% solution of tert-octylphenoxyethoxyethylbenzyldimethylammonium chloride monohydrate, and of mineral oil charged during the next 4.5 hours totals 0.245 part, 0.049 part and 48.75 parts, respectively. Additional lauryl mercaptan amounting to 0.036 part is also added during this time in the polymerization cycle.

At 6.5 hours, the batch is placed under reduced pressure and kept at 120° C. for 0.5 hour when the pressure gauge registers 10 mm. The stripped batch analyzes 39.5% solids as copolymer. At 210° F., its viscosity is 1681 cs.

In the Sundstrand Pump Test at 0.04 gram of the above copolymer in 100 ml. of oil, the weight of sludge is 28 mg., while the oil without additive gives 210 mg.

In the Panel Coker Test, a blend containing 1% of the above copolymer of this invention gives a deposit of 33 mg. The same oil without additive gives a deposit of 322 mg.

Six parts of the above product is blended with 1 part of a commercial zinc dialkyldithiophosphate into 93 parts of a 170 SUS Mid-Continent Solvent Extracted Neutral oil. The viscosity of this blend is 10.92 cs. at 210° F. and 67.15 cs. at 100° F. with a viscosity index of 139. The ASTM pour point of this lubricant is −20° F.

*Example 8*

Using the procedure described above in Example 3, a copolymer is prepared from 6.7 parts of dilauryl fumarate, 2.5 parts of vinyl acetate, and 0.8 part of 1-vinyl-2-piperazinone. The copolymerization is carried out in toluene at 90° C. using a total of 0.05 part of azobisisobutyronitrile. The yield of copolymer is 81%. This copolymer is transferred to 100 SUS Neutral Oil, as described in Example 3, before it is tested.

In the Sundstrand Pump Test at 0.04 gram of the above copolymer in 100 ml. of oil, the weight of sludge is 63 mg., while the oil without additive gives 210 mg.

In the Panel Coker Test, a blend containing 1% of the above copolymer of this invention gives a deposit of 83 mg. The same oil without additive gives a deposit of 322 mg.

Six parts of the above product is blended with 1 part of a commercial zinc dialkyldithiophosphate into 93 parts of a 170 SUS Mid-Continent Solvent Extracted Neutral oil. The viscosity of this blend is 9.39 cs. at 210° F. and 60.83 cs. at 100° F. with a viscosity index of 132. The ASTM pour point of this lubricant is −20° F.

*Example 9*

The procedure described in Example 3 is used to polymerize a monomeric mixture composed of 25.0 parts of cetyl-stearyl methacrylate, 11.5 parts of n-butyl methacrylate, 11.5 parts of styrene, and 2 parts of 1-vinyl-2-piperazinone. Cetyl-stearyl methacrylate is a methacrylic ester prepared from a commercial alcohol which analyzes 2% tetradecanol, 30% hexadecanol, and 68% octadecanol. Incremental additions of azobisisobutyronitrile is charged during the course of copolymerization totalling 0.05 part, and of toluene, 50 parts. Heating is stopped at 8 hours. The resulting solution analyzes 40% of copolymer.

The copolymer is transferred to a 100 SUS Neutral oil. A portion of the toluene solution is diluted with 100 SUS Neutral oil and the volatile matter is stripped from the solution on heating and stirring the solution finally at 125° C./10 mm. of mercury for 0.5 hour. The resulting solution is 25% of copolymer in oil.

In the Sundstrand Pump Test at 0.04 gram of the above copolymer in 100 ml. of oil, the weight of sludge is 22 mg., while the oil without additive gives 210 mg.

*Example 10*

Using the procedure of Example 3, 42 parts of diisodecyl itaconate is allowed to copolymerize with 8 parts of 1-vinyl-2-piperazinone using 1.5 parts of benzoyl peroxide and 5 parts of toluene at 110° C. Incremental additions of benzoyl peroxide are added during the course of the copolymerization total 0.05 part, and of toluene, 50 parts. Heating is stopped at 24 hours and the resulting solution analyzes 42.7% of copolymer. The toluene solution is mixed with 100 SUS Neutral oil and the volatile matter removed by stripping at 125° C./5 mm. The resulting concentrate is adjusted to 25% of copolymer. On treating an oil blend with 0.25% of copolymer, 100° F., 0.2% asphaltenes is dispersed readily.

*Example 11*

Following the procedure in Example 3, 4.75 parts of vinyl laurate and 0.25 part of 1-vinyl-2-piperazinone are allowed to copolymerize in the presence of toluene, using azodiisobutyronitrile as catalyst. A total of 0.025 part of azodiisobutyronitrile and 10.8 parts of toluene are used with a polymerization temperature of 100° to 103° C. during 11¾ hours to give 10.6 parts of solution which analyzes 37.5% copolymer.

After stripping the copolymer into 100 SUS Neutral oil, it is determined that 0.125% of copolymer disperses 0.2% of asphaltenes in an oil test blend at 150° C.

We claim:
1. A composition comprising a major portion of a member from the group consisting of a lubricating oil and a normally liquid hydrocarbon fuel and a minor portion sufficient to prevent sludge deposition of an oil-soluble copolymer having a molecular weight in the range from about 20,000 to 2,000,000 made from at least one monomer selected from the group consisting of $C_{1-18}$ alkyl esters of $\alpha,\beta$-unsaturated lower alkanoic acids, dialkyl fumarates, maleates and itaconates of up to 24 carbon atoms, vinyl esters of fatty acids and styrene and at least one compound having the formula

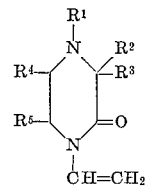

in which
$R^1$ is selected from the group consisting of hydrogen alkyl of up to 18 carbon atoms and aralkyl of up to 18 carbon atoms,
$R^2$ is selected from the group consisting of hydrogen and methyl,
$R^3$ is selected from the group consisting of hydrogen and alkyl of up to 18 carbon atoms,
$R^4$, individually, is selected from the group consisting of hydrogen and alkyl of 2 to 4 carbon atoms,
$R^5$, individually, is selected from the group consisting of hydrogen and alkyl of up to 4 carbon atoms, and
$R^4$ and $R^5$ collectively, including the carbon atom to which they are attached, form a five to seven member saturated ring optionally including alkyl substituents, wherein the total carbon content of $R^4$ and $R^5$ collectively is up to 18 carbon atoms, said compound being present in amount from about 0.5 to 80% by weight.

2. A composition according to claim 1 in which there is employed at least 0.1% and up to about 10% by weight of said copolymer in a lubricating oil.

3. A composition according to claim 1 in which there is employed at least 0.001% and up to about 0.1% by weight of said copolymer in a hydrocarbon fuel.

4. A composition according to claim 1 in which there is employed at least 2% by weight of said compound.

5. A composition according to claim 1 in which said monomer is alkyl ($C_1$ to $C_{18}$) methacrylate.

6. A composition according to claim 1 in which said monomer is alkyl ($C_1$ to $C_{18}$) acrylate.

7. A composition according to claim 1 in which said monomer is dialkyl ($C_1$ to $C_{18}$) fumarate.

8. A composition according to claim 1 in which said monomer is dialkyl ($C_1$ to $C_{18}$) maleate.

9. A composition according to claim 1 in which said monomer is dialkyl ($C_1$ to $C_{18}$) itaconate.

10. A composition according to claim 1 wherein said monomer is lauryl-myristyl methacrylate.

11. A composition according to claim 1 in which said monomer comprises cetyl-stearyl methacrylate.

12. A composition according to claim 1 in which said monomer comprises a vinyl ester in which the carboxylate portion contains 1 to 18 carbon atoms, including the carbon of the carboxylate function.

References Cited by the Examiner

UNITED STATES PATENTS

| | | | |
|---|---|---|---|
| 2,944,974 | 7/1960 | Lorensen | 252—51.5 |
| 3,067,163 | 12/1962 | Bauer | 252—51.5 X |

DANIEL E. WYMAN, *Primary Examiner.*

P. P. GARVIN, *Assistant Examiner.*